April 26, 1966

R. W. KRAEFT 3,247,858

MACHINE FOR CLEANING AND ASSORTING TABLE SILVER AND
CONTROL MECHANISM THEREFOR

Filed Feb. 25, 1964

INVENTOR
Robert W. Kraeft

BY Maw Kinney & Maw Kinney
ATTORNEYS

April 26, 1966

R. W. KRAEFT 3,247,858

MACHINE FOR CLEANING AND ASSORTING TABLE SILVER AND
CONTROL MECHANISM THEREFOR

Filed Feb. 25, 1964

INVENTOR
Robert W. Kraeft

BY Mawhinney & Mawhinney
ATTORNEYS

INVENTOR
Robert W. Kraeft

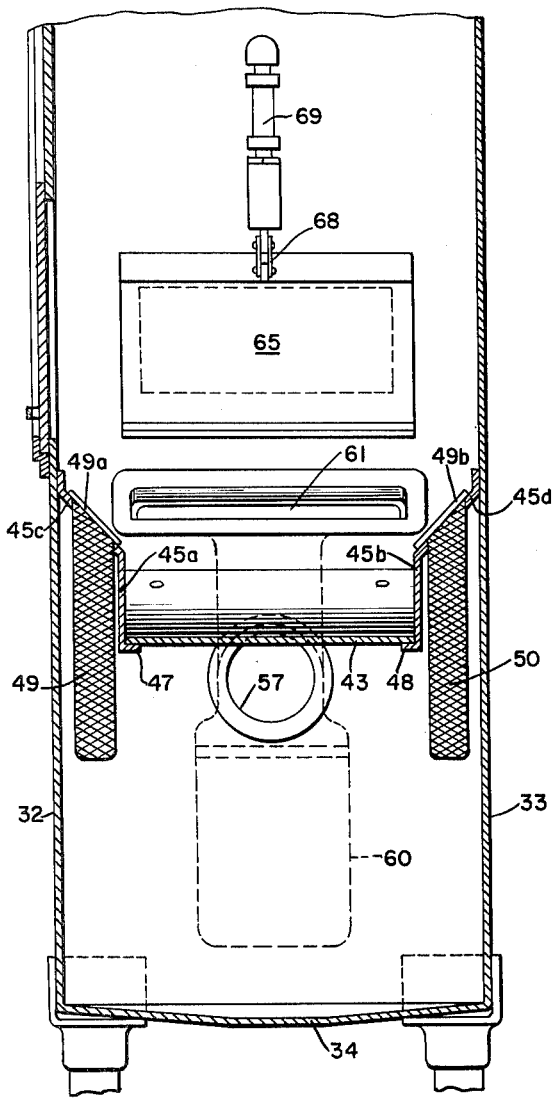
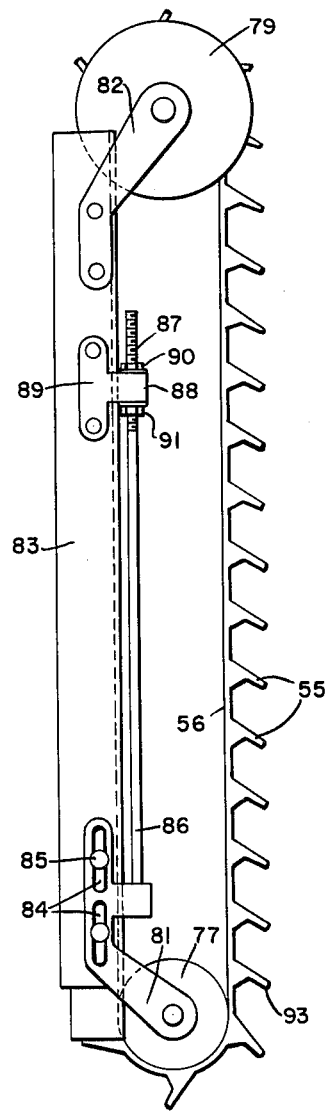
FIG.5.
FIG.6.

April 26, 1966  R. W. KRAEFT  3,247,858
MACHINE FOR CLEANING AND ASSORTING TABLE SILVER AND
CONTROL MECHANISM THEREFOR
Filed Feb. 25, 1964  10 Sheets-Sheet 6

INVENTOR
Robert W. Kraeft

BY Mawhinney & Mawhinney
ATTORNEYS

April 26, 1966  R. W. KRAEFT  3,247,858
MACHINE FOR CLEANING AND ASSORTING TABLE SILVER AND
CONTROL MECHANISM THEREFOR
Filed Feb. 25, 1964  10 Sheets-Sheet 7

INVENTOR
Robert W. Kraeft

BY Mawhinney & Mawhinney
ATTORNEYS

April 26, 1966 R. W. KRAEFT 3,247,858
MACHINE FOR CLEANING AND ASSORTING TABLE SILVER AND
CONTROL MECHANISM THEREFOR
Filed Feb. 25, 1964 10 Sheets-Sheet 8
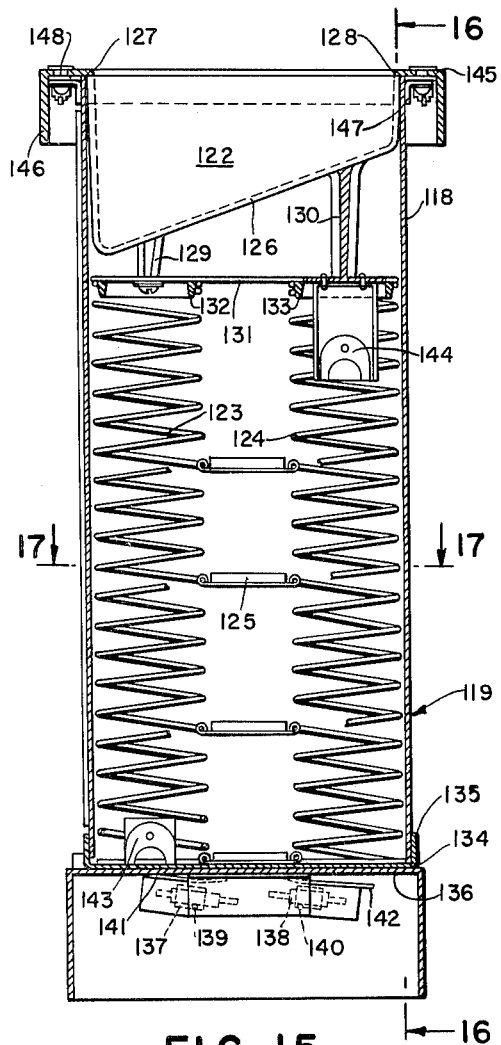
FIG. 15.
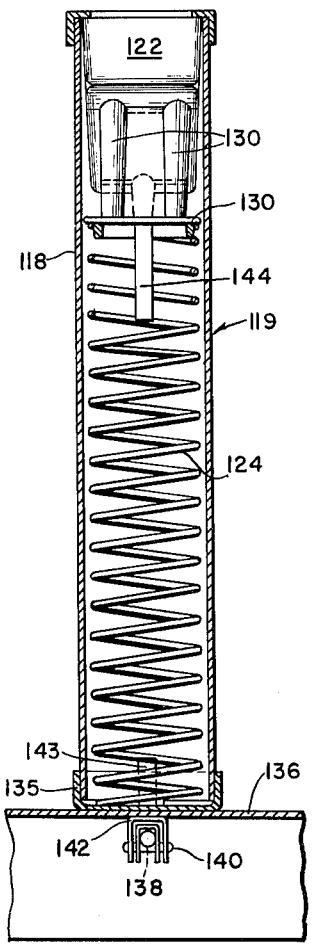
FIG. 16.
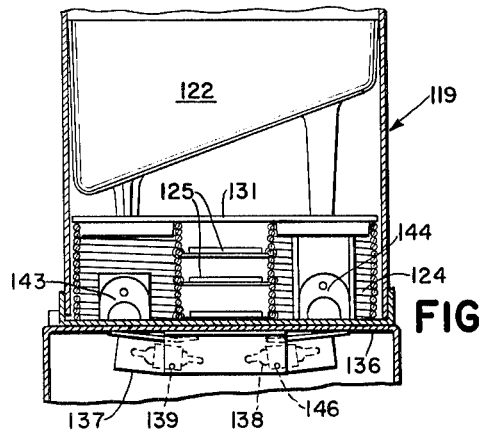
FIG. 18.
FIG. 17.
INVENTOR
Robert W. Kraeft
BY Mawhinney & Mawhinney
ATTORNEYS INVENTOR
Robert W. Kraeft INVENTOR
Robert W. Kraeft United States Patent Office 3,247,858
Patented Apr. 26, 1966

3,247,858
MACHINE FOR CLEANING AND ASSORTING TABLE SILVER AND CONTROL MECHANISM THEREFOR
Robert W. Kraeft, 60 Commercial Ave., Moonachie, N.J.
Filed Feb. 25, 1964, Ser. No. 347,226
17 Claims. (Cl. 134—46)

The present invention relates to process and machine for cleaning and assorting table silver and control mechanism therefor.

An object of the present invention is to provide a completely automatic machine for cleansing table silverware, assorting the cleansed articles and delivery thereof to individual bins for receiving same.

Another object of the invention is to provide a machine for use in restaurant kitchens and the like adapted to handle large quantities of table silver involving cleansing, drying and assorting the articles with delivery of like articles to their respective several bins.

A further object of the invention is to provide a completely automatic control system for a machine as above described on which upon initiating operation the machine will automatically go through a cycle of cleansing, drying, assorting a preselected quantity of silverware subject to stoppage as each bin receives its capacity load of cleansed silver.

A still further object of the invention is to provide an improved form of cleansing unit in which an extremely efficient cleansing action is had.

Another object of the invention is to provide a machine of this character involving a novel form of assorter.

A further object of the invention is to provide a machine embodying cleansing and assorter units with transfer mechanism therebetween all arranged for compactness to adapt the machine for small space installment.

A still further object of the invention is to provide a novel form of receiving bin for the assorted silver and included support platform involving a switch closed automatically when the bin is in position for placing the system in condition for automatic operation and a further normally closed switch openable automatically when the bin is filled to capacity for automatically opening to arrest automatic operation of the machine until an empty bin replaces the full bin.

The invention further contemplates certain circuit diagrams including electrical components by which various operations of cleansing, orienting the silver for convenient loading upon the conveyor, driving the conveyor and the assorter rolls to which the cleansed silver is delivered and which in turn selectively delivers the silver to the respective bins.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 5 is a fragmentary vertical cross-sectional view taken on the line 5—5 in FIGURE 4.

FIGURE 6 is an end elevational view of a form of elevating conveyor for transferring the silver articles from the cleansing chamber to the assorter, and illustrating a form of belt tightener.

FIGURE 15 is a cross-sectional view through a form of bin and supporting platform illustrating forms of control switches and actuating means.

FIGURE 16 is a vertical sectional view taken on the line 16—16 of FIGURE 15.

FIGURE 17 is a horizontal sectional view taken on the line 17—17 of FIGURE 15.

FIGURE 18 is a fragmentary vertical sectional view like FIGURE 15 showing the lowermost position of the bin receptacle and elevating springs and showing the tripped open position of one of the switches.

Figure 1:
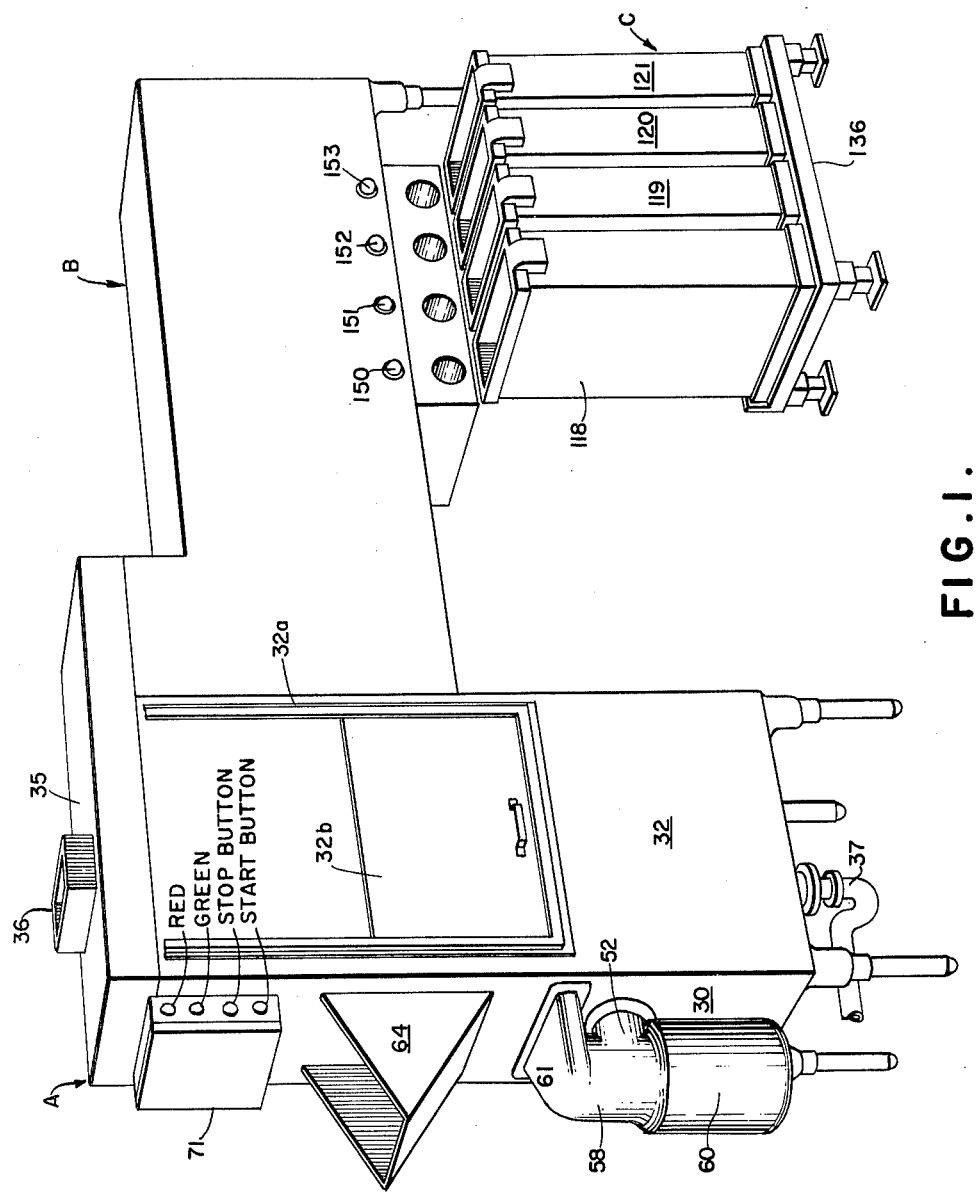
FIGURE 1 is a perspective view of one form of machine for cleaning and assorting table silver.

Referring more particularly to the drawings in FIGURE 1 which illustrates an in-line form of machine, A designates the cleaning unit, B the assorter and C a bin group in which, for example, four bins are in place positioned to receive the cleansed and assorted silverware after passage through the machine.

*Cleansing unit*

As more particularly illustrated in FIGURES 2 to 8 inclusive, the cleansing unit is mounted in a casing which may be generally constituted of a front wall 30, a rear wall 31, side walls 32 and 33, a bottom wall 34 and a top wall 35 having a stack or vapor vent 36.

Figure 8:
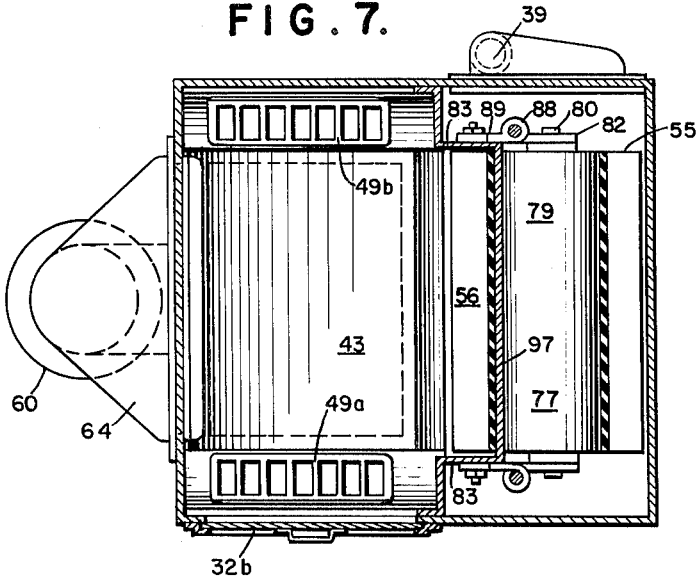
FIGURE 8 is a horizontal section taken on a somewhat magnified view on the line 8—8 in FIGURE 4.

In the bottom wall 34 is a cleansing liquid drain 37 having a controlling hand-actuated valve 38. The overflow 39 connects with this drain 37 below the valve 38, as shown in FIGURES 3 and 8.

Figures 2, 14:
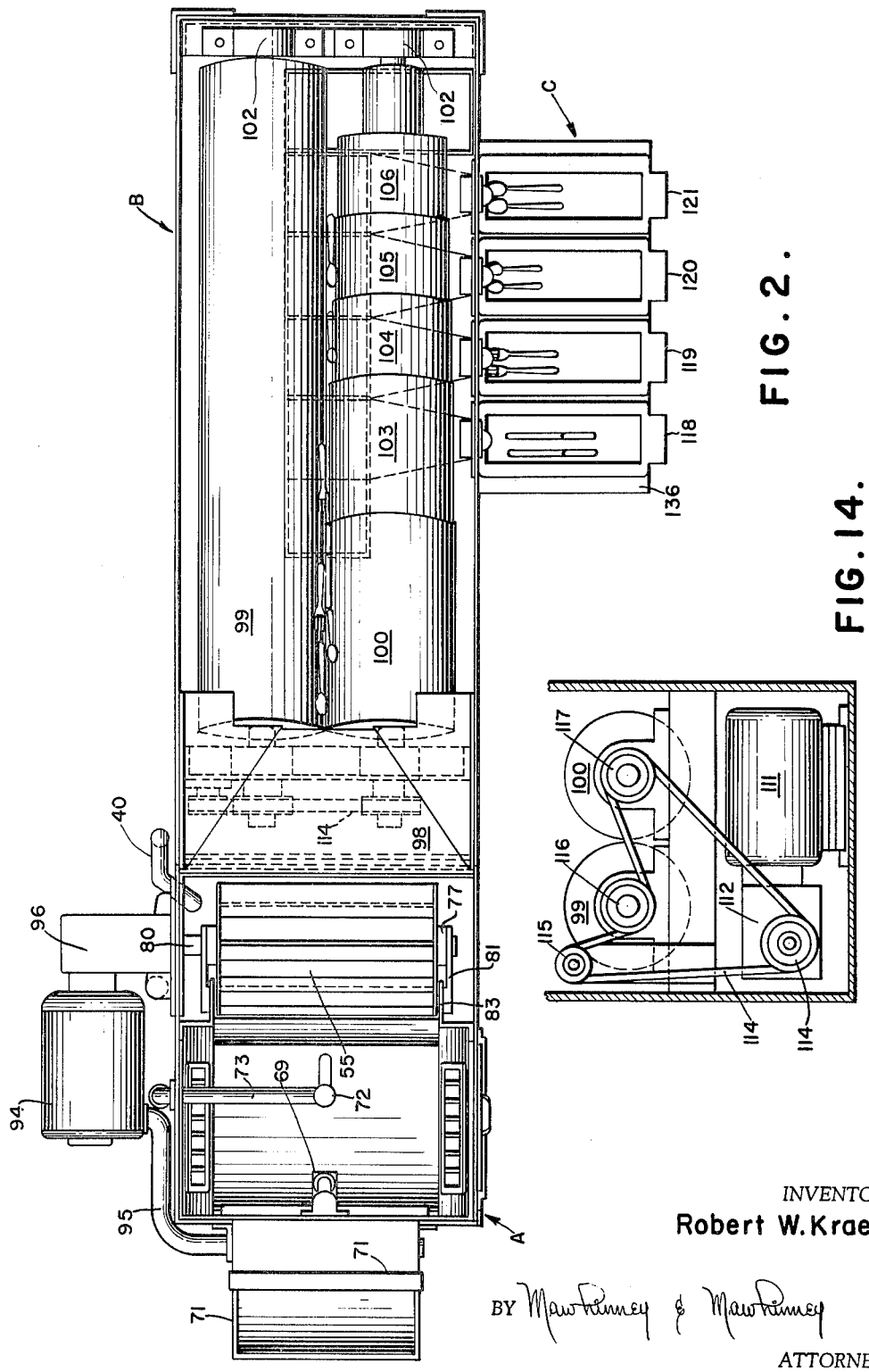
FIGURE 2 is a top plan view of the machine with the top cover removed.
FIGURE 14 is a cross-sectional view taken on the line 14—14 of FIGURE 9 illustrating a form of drive for the assorter rolls.
Figure 3:
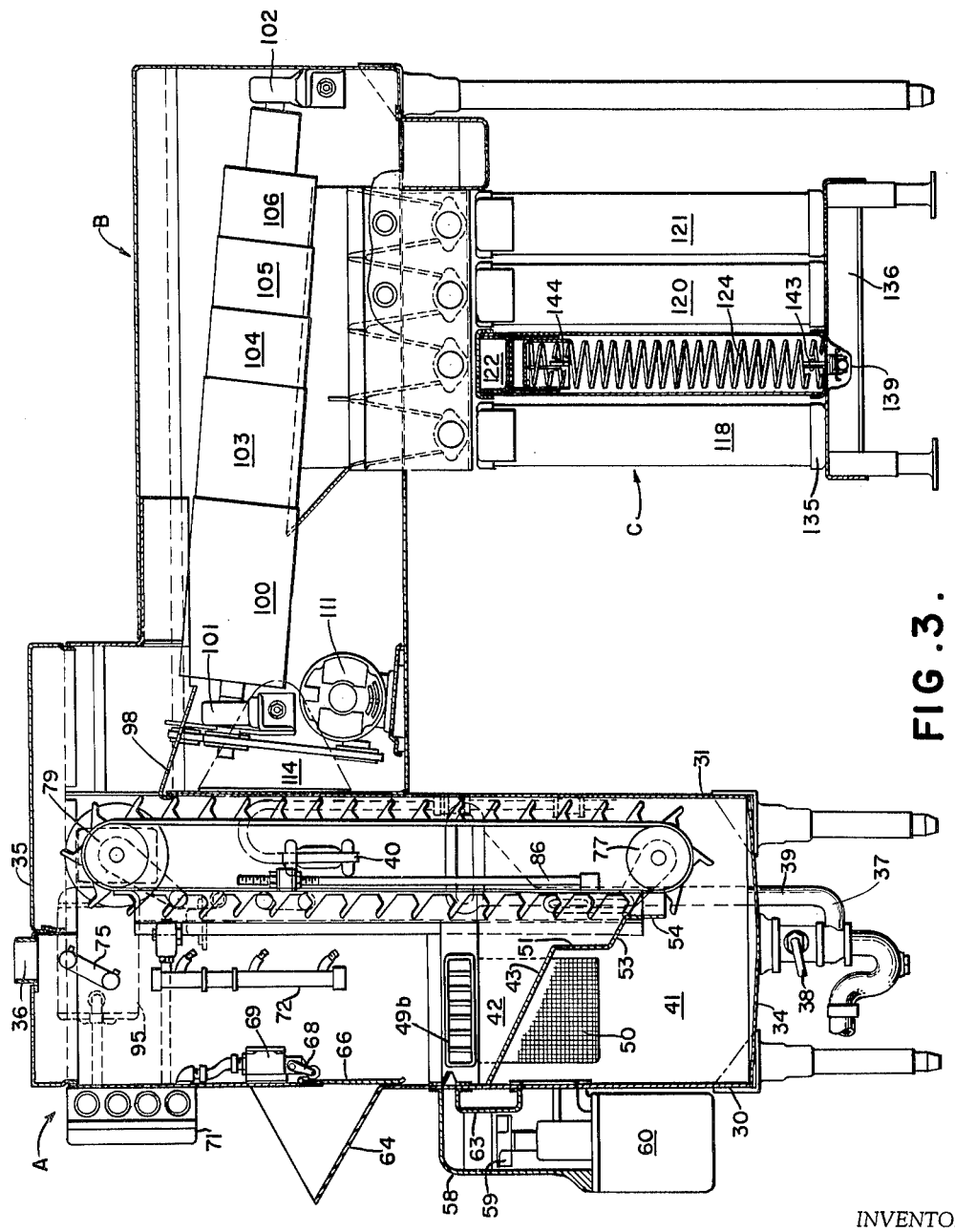
FIGURE 3 is a longitudinal vertical sectional view of the machine with the cover removed and illustrated portions of the cleansing chamber and a form of bin and its platform seat in section.

Wash water is supplied to the interior of the casing in any suitable manner, for instance, by a pipe 40 shown more particularly in FIGURES 2 and 3. This wash water descends into the lower portion of the tank which constitutes a reservoir 41 for the wash water.

The reservoir 41 is divided from a cleansing chamber 42 by a suitable partition constituted mainly by a partition plate 43 preferably removable for cleaning and detachably secured as by the fastenings 44 to a frame 45 having an opening 46 through which, when the plate 43 is removed, access may be had from the cleansing chamber 42 down into the reservoir 41. The frame 45 may be constituted by the two side members 45ª and 45ᵇ (FIGURE 5) having inturned flanges or ledges 47 and 48 upon which the detachable plate 43 may be, at least in part, supported as to side edges thereof.

Figure 7:
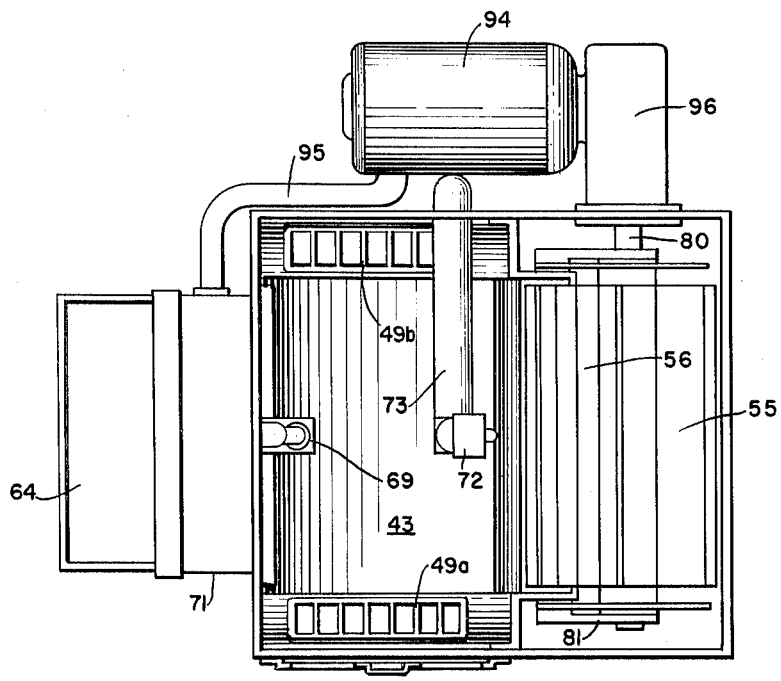
FIGURE 7 is an enlarged top plan view, with the casing cover removed, illustrating the cleansing chamber and the elevator.

The side members 45ª and 45ᵇ, as shown in FIGURE 5, are spaced inwardly from the side walls 32 and 33, there being diagonal sections 45ᶜ and 45ᵈ which are inclined and slotted to receive detachably therethrough strainers 49 and 50. These strainers may be of box or bag form having top frames 49ª and 49ᵇ extending at a similar inclination to the diagonal parts 45ᶜ and 45ᵈ against which the frames 49ᵃ and 49ᵇ rest in the support of the strainers 49, 50. These frames 49ᵃ and 49ᵇ are open, preferably as indicated in FIGURES 4, 7 and 8, in a grilled pattern for strength but to permit free entrance through the open mouths of the strainers of any foodstuffs or other foreign particles carried into the cleansing chamber 42 by the silver articles.

As shown in FIGURE 5 the inclinations of the mouths of the strainers 49, 50 induce sliding of foreign matter received above the strainers which are not admitted thereto down onto the partition plate 43 or into the body of agitated wash water in the chamber 42. Thus there are no horizontal ledges or shoulders in the wash chamber which would support accumulations of foreign matter.

Figure 4:
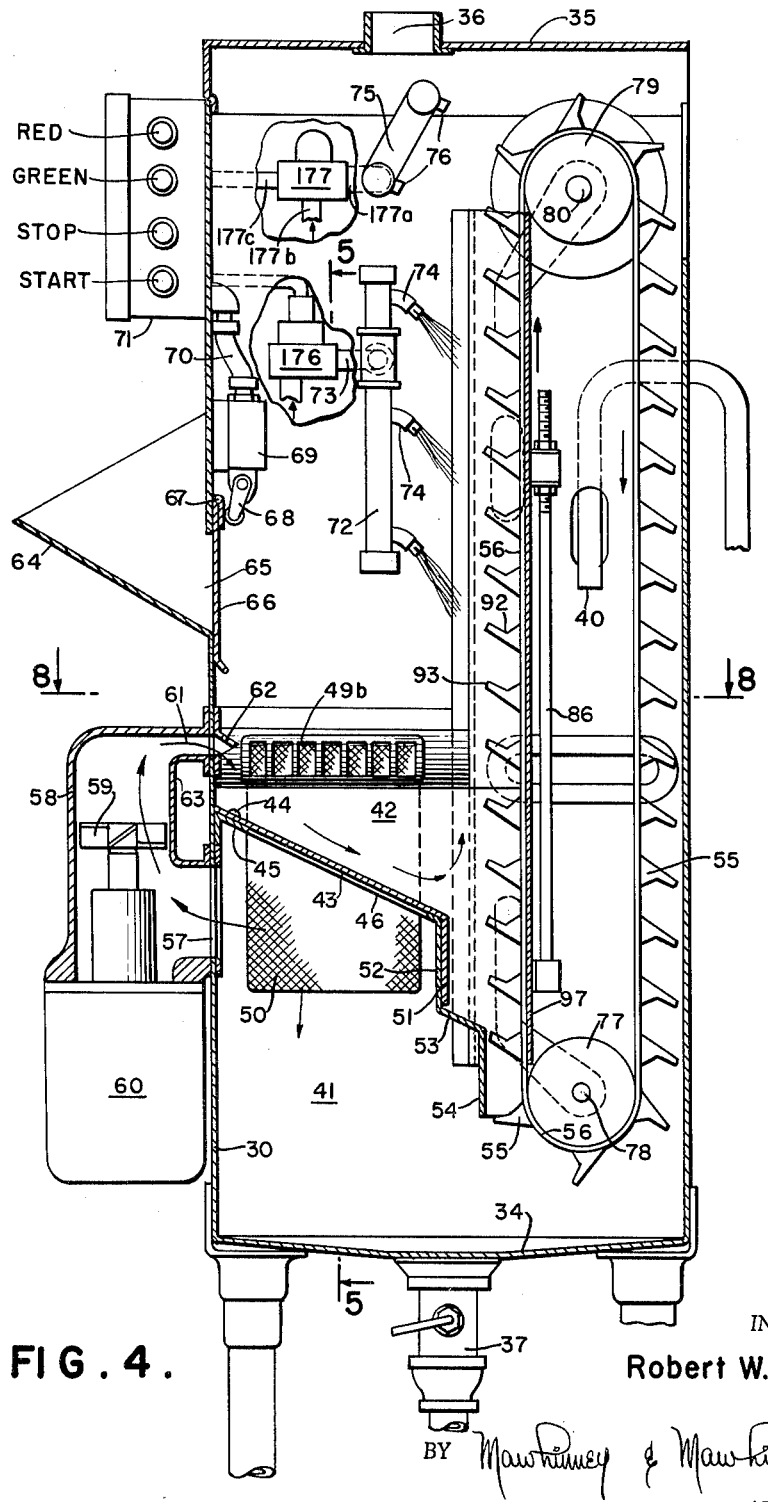
FIGURE 4 is a vertical sectional view taken on a magnified scale through the cleansing unit including the conveyor.

As shown in FIGURE 4, the plate 43 is on a downward inclination from the front wall 30 rearwardly, and at its rear end terminates in an angular downward extension 51 which laps an upright wall 52 of the rear lower end of the frame 45. The upright wall of the frame 45 rises from the forward end of a diagonal wall 53 of the frame 45. In turn the lower end of the diagonal wall 53 merges or connects with the upper end of an upright tunnel wall 54 confining with the conveyor or elevator as hereinafter described, an upright tunnel for the upright movement therethrough of the cleats on the endless belt 56 of the conveyor.

As will be observed from FIGURES 4 and 5, the lower portions of the strainers 49 and 50 depend into the reservoir 41.

The reservoir 41 has, through the front wall 30, an opening 57 communicating with a pump chamber 58 containing an appropriate pump having an impeller 59 driven by an electric or other motor 60 carried by the pump casing. The impeller will preferably rotate in a substantially horizontal plane and have the vanes of its impeller so inclined as to lift wash water entering the pump chamber through the opening 57 and circulate such wash water through a port 61 into an upper forward portion of the cleansing chamber 42. The orifice 61, as shown in FIGURE 5, is preferably flat and has considerable lateral extension so that the wash water under the impetus of the pump will fan out on its introduction into the forward upper portion of the cleansing chamber 42.

As best seen in FIGURE 4, a deflector plate 62 is affixed, for instance, to the front wall 30, in position to hood the rear portion of the port 61 and deflect the wash water downwardly onto the silver articles in the chamber 42.

At 63 is illustrated simply a structural member carried externally by the front wall 30 or other appropriate part forming with the pump casing 58 a restricted passage in the area of the impeller 59 to promote efficient action of the propeller and a strong current of wash water to the cleansing chamber 42 with the result that in the chamber the wash water will be subjected to considerable agitation with the end in view of promoting rapid and thorough cleansing action.

The silverware is introduced into the open upper portion of the chamber 42 through a chute 64 attached externally of the front wall 30 at a point above the chamber 42, the front wall 30 being formed with an entrance opening 65 normally closed by an inwardly opening door 66 hinged or otherwise supported as at 67 to the internal surface of the front wall 30 at a point above the induction opening 65. This door 66 will open automatically under the weight and gravity feed of the silver articles sliding down the chute and into the interior of the casing.

A roller actuated arm 68 of a micro-switch 69, affixed internally to the front wall 30 above the door 66, rests against an internal portion of the door at a suitable point below the hinge axis to be automatically tripped incident to opening of the door 66. The micro-switch has electrical connections through conduit 70 to an electrical control box 71 conveniently mounted upon and exteriorly of the front wall 30 at an upper portion of the casing.

The wash water will be diverted by the inclined plate 43 downwardly in a rear direction and may descend through a trough comprised between the downward extension or apron 51 of the plate 43 and the front ascending leg of the conveyor or elevator 56.

The trough is narrow in respect to knives, forks, spoons and the like table silver articles so that these long narrow articles will be adjusted in descending into the trough to a lengthwise orientation suitable for receiving upon the upper surfaces of the cleats 55 of the conveyor. It will be noted also preferably from FIGURE 4 that the presence of the diagonal wall 53 at the base of the trough contributes to the delivery of the articles to the cleats 55.

Still referring more particularly to FIGURE 4 and also to FIGURES 2 and 3, a stand pipe 72 is supported in the space above the chamber 42 to which rinse water may be delivered through a lateral pipe 73 and issue from nozzles or jets 74 upon the silver in the pockets of the conveyor cleats. There are preferably a number, three being shown, of the nozzles 74 at various elevations. This rinse water is preferably at an elevated temperature and if desired supplied to the nozzles under suitable pressure.

It will also be understood of course that the wash water may be heated and that suitable detergent may be included therewith.

In the uppermost portion of the front casing A is a drying unit 75 including suitable ducting and spray nozzles 76 positioned to direct sprays of hot or drying air or fluid upon the silverware being carried at the upper portion of the conveyor.

As shown in FIGURE 1, the front wall has a frame 32ᵃ for a vertically sliding door 32ᵇ which exposes an opening through which access may be had to the interior of the cleansing chamber.

The conveyor

Referring more particularly to FIGURES 2, 4, 6, 7 and 8, the conveyor belt 56 which may be of any suitable flexible material calculated to withstand the ravages of water, both hot and cold, and hot air, is trained about a lower roller 77 journalled to rotate about an axis 78 and an upper roller 79 journalled to rotate about an axis 80. The axes 78 and 80 are preferably in vertical alignment or substantially so in order that the conveyor may be strictly vertical and, for instance, not inclined as an inclined elevator or conveyor demands more lengthwise space in the case and a generally longer casing.

In view of the limitations of space in which machines of this kind are to be installed, it is desirable that the lengthwise dimension of the machine as a whole shall be as small as possible consistent with other requirements imposed on a machine for performing this varied work.

As shown more particularly in FIGURE 6, lower brackets 81 and upper brackets 82 support the trunnions of the rollers 77 and 79, such brackets being affixed to structural members 83 mounted in the casing in any suitable manner. The brackets of one or other of the rollers; in this instance, the brackets 81 of the lower roller 77, are provided slots 84 adjustable up and down with respect to screws or other fastenings 85 which enter the structural members 83. The bracket 81 is connected to a rod 86 having a threaded upper end 87 passing up through a lug or eye 88 of a bracket 89. Nuts 90, 91 are threaded on the rod 86 and engage opposite sides of the lug or eye 88 to maintain the adjustment after the same has been made. By backing off the nuts 90, 91, the rod 86 may be pushed downwardly to tighten the belt.

This belt tightening arrangement may be repeated at both sides of the conveyor as indicated in FIGURE 2 where two structural members 83 are shown.

As shown to best advantage in FIGURE 4, the cleats 55 are of a construction which contributes to the upright positioning of the conveyor in that these cleats are cupped on upper surfaces of the ascending run of the conveyor. Such formation provides depressed pockets 92 and upturned free edges 93. These cleats may be made from rubber, a rubber composition or a suitable plastic or the like which may be vulcanized or otherwise affixed to the belt at suitably spaced distances apart so that the silverware will be easily accommodated in the space between adjacent cleats.

As shown more particularly in FIGURE 2, the belt is driven by an electric or other motor 94 receiving current through wires in a conduit 95 extending to the control box 71. The motor 94 drives a reduction gear 96 connected to the upper shaft 80 of the conveyor.

As shown more particularly in FIGURE 8, a vertical wall 97 is connected laterally between the structural members 83 positioned rearwardly of the ascending belt 56 of the conveyor and constituting a backing therefor to maintain generally alignment of the belt and its cleats and to prevent sagging of the cleats under load. This wall 97 is of value also in the area rearwardly of the trough and tunnel to prevent accumulations of silver in the trough and to oppose rearward thrusts of the silverware against the front side of the forward run of the conveyor. In other words, this wall 97 will keep the ascending run of the conveyor and its cleats up to the work.

The cleats are narrow for the accommodation of the silver and the orientation of the latter to lengthwise positions in the trough cooperates with the formation of the cleats to individually receive and elevate the various silver articles.

The assorter

Referring more particularly to FIGURES 2, 3, 9 to 13 inclusive and FIGURE 14, the assorter B is contained in a casing having communication at its upper end with the upper portion of the descending run of the conveying elevator and a chute 98 is positioned to receive the silverware articles unloaded from the cleats of the conveyor incident to the movement of such cleats around the upper roller 79 of the conveyor.

This chute 98 inclines downwardly and rearwardly to the nip between a pair of assorter rolls 99 and 100. These rolls are journalled in front bearings 101 and rear bearings 102 carried by casing or other structural parts of the machine. The rolls are driven in opposite directions pursuant to the arrows indicated in FIGURE 10. The axes of both rolls are inclined to the horizontal through a sufficient angle which, together with the motion or rotation of the rolls, will gravitate silver articles from the receiving end beneath the chute 98 down to discharge sections of the roll 100. As best seen in FIGURE 2, this roll is stepped down in diameter through the required number of sections 103, 104, 105 and 106. The four graduations of this roll 100 is merely exemplary.

The other companion roll 99 will preferably be of uniform diameter throughout.

Figure 9:
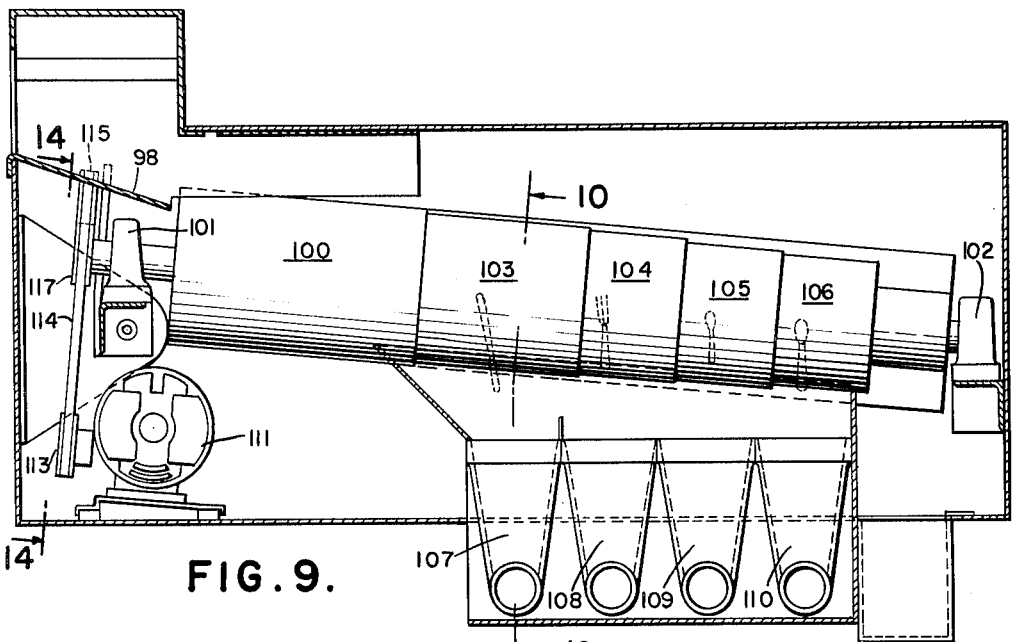
FIGURE 9 is a longitudinal sectional view taken through the assorter.

The various sections of the roll 100 open successively wider gaps to the silver articles as such articles are moved down the nip or bight between the rolls. These gaps, as shown in FIGURES 9 and 10, communicate with separate chutes 107, 108, 109 and 110 which discharge downwardly to individual bins in the bin group C.

Figure 10:
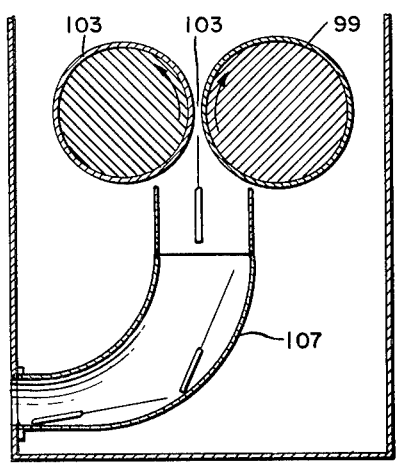
FIGURE 10 is a vertical cross-sectional view taken on the line 10—10 in FIGURE 9.

The rolls may be driven in any desired manner, for instance, through an electric motor 111, as shown in FIGURE 14, having a reduction gear 112 arranged to drive a roller 113 around which is trained a flexible belt 114, which, after running about an idler 115, is looped successively in relative opposite directions about the rollers 116 and 117 of the rolls 99 and 100, thus communicating to the rollers rotary motion in opposite directions in which adjacent peripheral portions of the rollers ascend through the gaps, for instance, through the gap 103 of FIGURE 10. The rollers may be of suitable material coated with rubber or other desired substances.

FIGURES 10, 11, 12 and 13 show successively larger gaps.

IN FIGURE 10 the gap is sufficient for the passage of knives which are more or less straight articles, while forks and spoons have offset tines or bowls and, therefore, require larger gaps for their passage.

Figure 11:
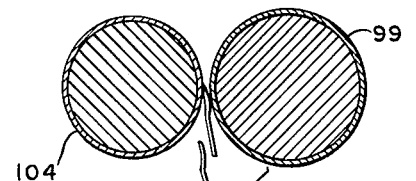
FIGURES 11, 12 and 13 are progressive cross-sections taken through sequential portions of the assorter.
Figure 12:
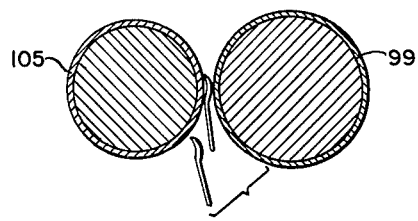
Figure 13:
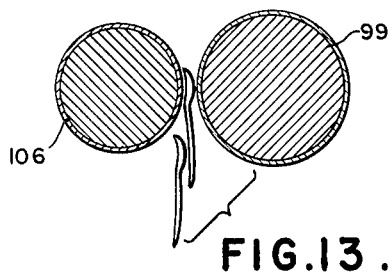

FIGURE 11 shows the passage of forks; FIGURE 12 the passage of teaspoons and FIGURE 13 gaps of a size to pass tablespoons.

Bin group

Referring more particularly to FIGURES 1, 2, 3, 15, 16, 17 and 18, the bin group C is shown as comprising four bins, being a number which corresponds with the various assorting sections of the assorter roll 100, but this bin arrangement and its control apparatus may be used with a single bin or any number of bins.

These four bins are identified by the numerals 118, 119, 120 and 121 and comprise receptacles closed as to all sides and the bottom and open at the top wherein trays 122 are carried upon a system of coil springs or the like 123, 124 tied together preferably at selected convolutions by connecting pieces 125.

The trays preferably have sloping bottoms 126 and are confined within the perimeters of their respective receptacles by top frames of rectangular or other configuration having inwardly projecting lips 127 and 128 which overlap the internal space of the receptacle and, therefore, constitute limit stops for de-limiting the uppermost position of the tray under the normal expansive action of the elastic means 123, 124.

The inclined bases of the trays 122 are affixed by legs 129 and 130 to a cap member 131 having downwardly projecting rings 132 and 133 about which the uppermost helices of the coil springs 123, 124 fit to localize the spring helices and prevent them from slipping out of axial alignment.

The lower ends of the springs are fitted against the bottom walls 134 of the bin, which bottom walls may have upstanding flanges 135 embracing and if desired secured to lower portions of the tubular wall that forms the receptacle.

The bins are adapted to be seated upon a platform 136 which is preferably hollow to offer an enclosed protected compartment for a double series of electric switches 137 and 138 comprising a rear group and a forward group. These switches are preferably mercury switches tiltably mounted about axes 139 and 140 and having armatures 141 and 142 disposed in vertical alignment with magnets 143 and 144. The rear set of magnets 143 is affixed to the bottom section 134 of the bin in alignment with the armature 141.

The magnet 144 is carried by the cap piece 131 within the convolutions of the coil 124 in vertical alignment with the armature 142 of the switch 138.

The rear switches 137 are normally open and are closed only when the bin is in place on the platform. The front switch or switches 138 are normally closed and open only when the tray 122 has descended to its lowermost full position carrying therewith the magnet 144 down into a position of influence relative to the armature 142, thus attracting the armature, tilting the switch 138 and opening the circuit. In other words all bins must be in place and all trays in an upper position before both sets of switches 137 and 138 are closed to permit normal operation of the cycle.

The top frames 145 of the bins have dependent flanges 146 which outstand from the bin walls while the frames may rest upon angle irons 147 affixed to and outstanding from the receptacle walls, there being removable fastenings 148 for connecting the frames 145 in place on the angle irons 147.

The bins will, of course, be of non-magnetic material as well as the platform supporting the same.

Control system

Figure 19A:
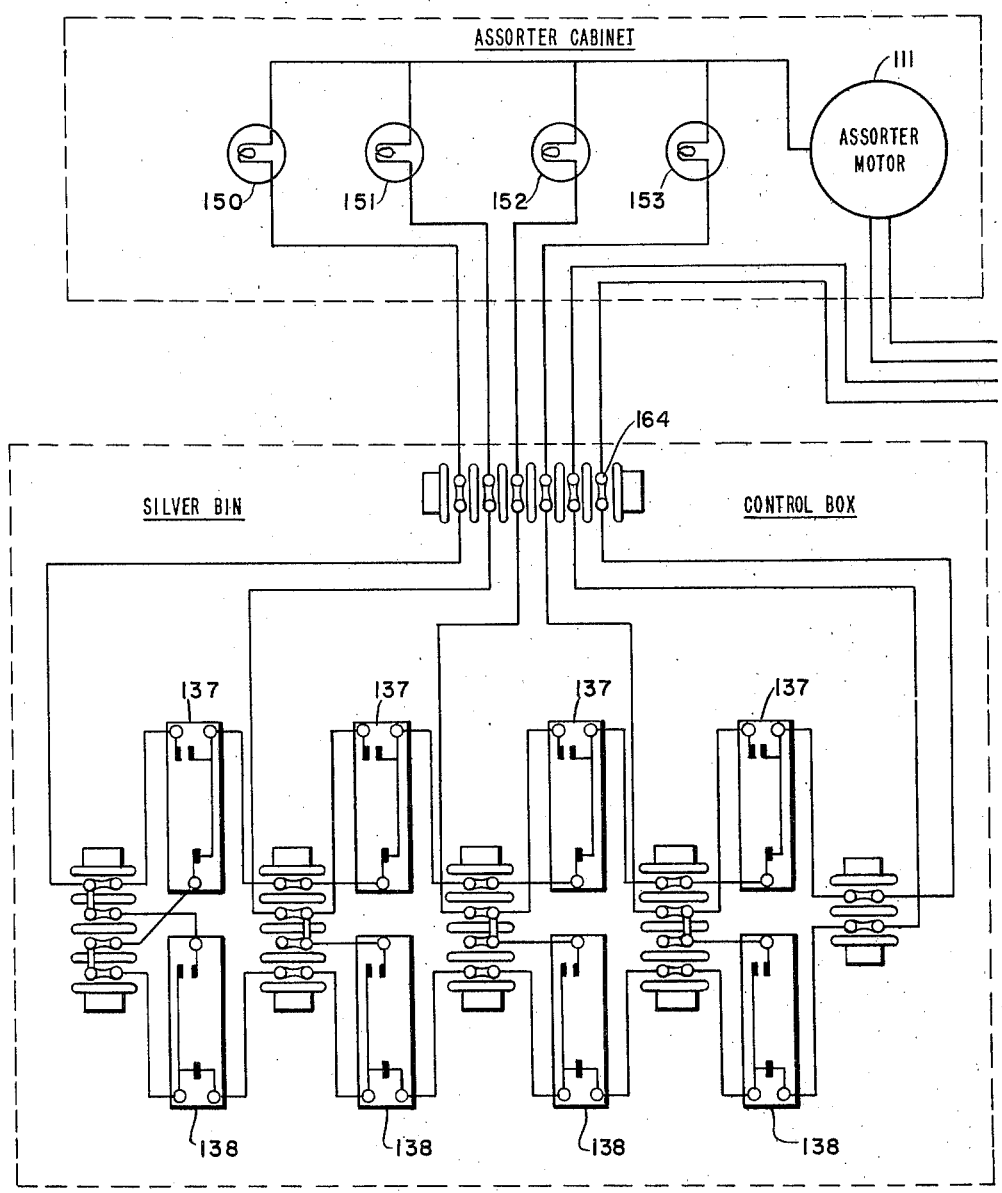
FIGURES 19A and 19B illustrate a preferred form of circuit control diagram and included electrical components.

FIGURE 19A shows the series of rear switches 137 and the series of front switches 138 all connected in series and housed within the bin platform which is labeled in this figure as Silver Bin Control Box.

The circuit of 19A shows the silver bins in place and empty. In other words the various switches 137 and 138 are all closed and ready for the continuous passage of current when the system is energized as hereinafter stated.

When the bins are in place the normally open rear switches 137 are closed and thus permit power to the front switches 138. The front switches, through their normally closed contacts, permit power to terminal 149 of the pneumatic timing relay.

When there is reverse condition at any bin position on either the rear or front switch, for instance, bin not in place (rear switch) or full (front switch), power is interrupted to terminal 149 of pneumatic timing relay and diverted to an appropriate red light 150, 151, 152 or 153 over that position.

Figure 19B:
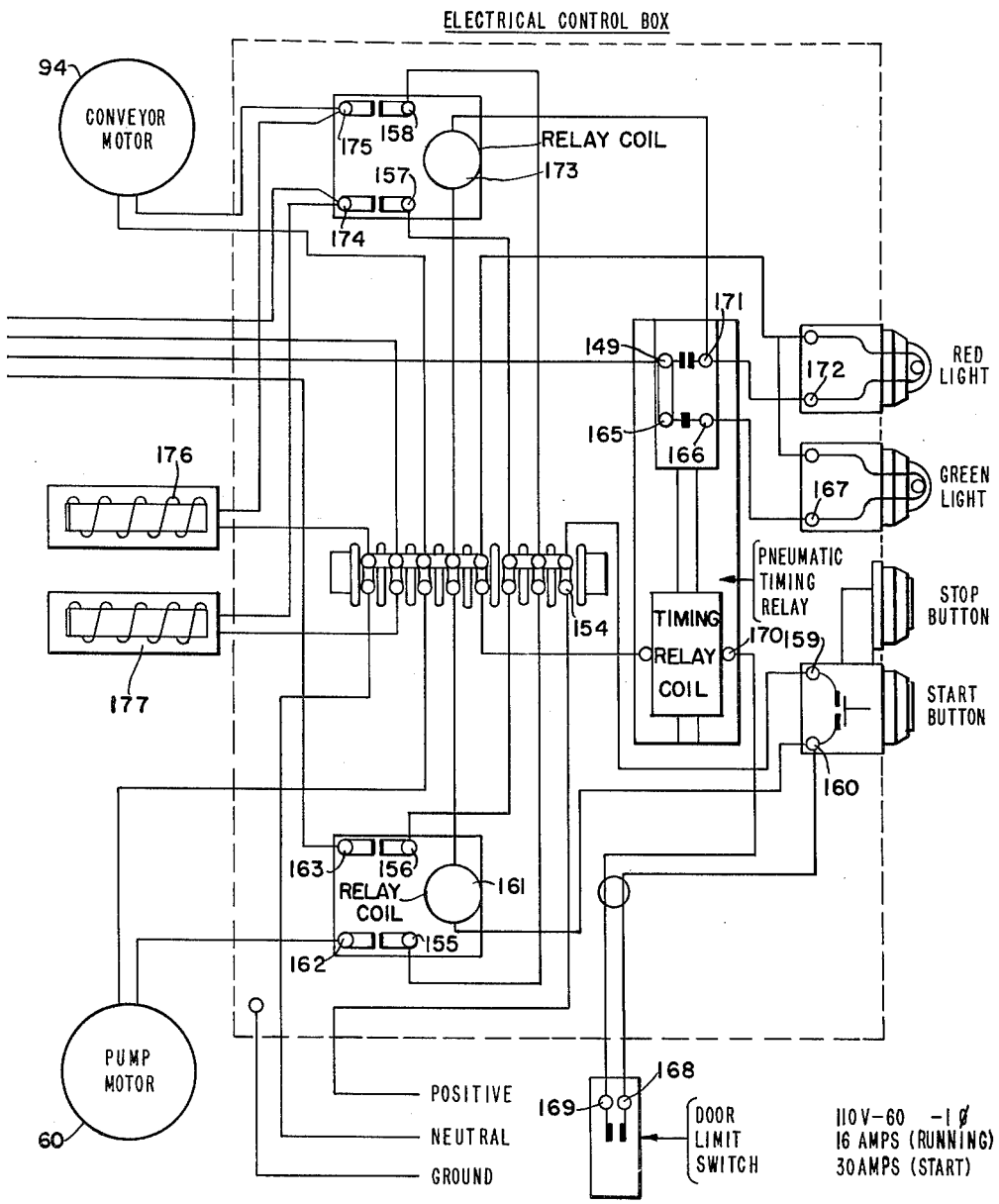

In FIGURE 19B the electrical control box 71 is shown schematically, the operating being in the following stages:

ELECTRICAL CONTROL
Power sequence

*Stage 1.*—Incoming power is connected to terminal 154 on terminal block connecting lines to relay terminals 155, 156, 157, 158 and start button terminal 159 (all having normally open contacts).

*Stage 2.*—Pushing start button closes contacts 159 and 160. Contact 160 connects to door limit switch (having normally open contacts) plus relay coil 161. Contacts 155, 162 and 156, 163 close, starting pump motor 60 and power supply to silver bin control box at 164.

Silver bin control box (wired in series), when actuated properly (silver bins in place and empty), allows power to pneumatic timing relay 149 (having normally open and normally closed contacts). Power continues through closed contacts 149, 165, 166 to post 167, lighting green light.

*Stage 3.*—When silver is introduced into the machine, the door limit switch is actuated, closing contacts 168 and 169, energizing pneumatic timing relay coil 170. Contacts 149, 165 and 166 open, turning off the green light at 167 and closing contacts 149, 171, turning on the red light at 172 plus energizing relay coil 173. Contacts 157, 174 and 158, 175 energize conveyor motor 94, solenoid valve 176, assorter drive motor 111 and solenoid valve 177.

Stage 3 reverts back to Stage 2 when pre-set time-on pneumatic relay elapses, opening contacts 149, 171 and closing contacts 165, 166.

In operation

In operation, with all the bins in place on the platform 136 and all bins empty with the bin trays 122 in the raised position, as shown in FIGURES 15 and 16, all of the switches 137 and 138 will be closed in readiness to establish circuits through the various electrical components illustrated in the circuit diagram, FIGURES 19A and 19B, including the pump motor 60, conveyor motor 94, assorter motor 111, however, such circuits are still open at the start button terminals 159, 160.

To start the machine the start button is manually depressed which thereupon sets in operation the sequence of operations described above in power sequence Stages 1, 2 and 3. Such operations following the introduction of silver articles through the entrance chute 64 into the cleansing chamber 42.

The pump motor 60 thereupon drives the pump impeller 59 bringing up wash water from reservoir 41 through the pump casing 58 and delivers the same through the port 61 upon the silver in the cleansing chamber 42. This will promptly build up a liquid level in the chamber in the vicinity of the port 61 so that the incoming liquid entering forcibly through this pump will create great agitation of the liquid in the chamber 42, thus tending to cleanse the silverware and dislodge all particles or foreign matter adhering thereto, which foreign matter will be generally deposited in the strainers 49, 50. The wash water, with or without detergent, will be re-circulated through the strainers to the reservoir 41 forming a closed cycle for the turbulent wash water and insuring that such water in circuit is forcibly driven by the pump into a continuously agitated state in the cleansing chamber 42.

Incident to this cleansing operation, the silverware is being moved by gravity through the inclination of the bottom plate 43 down to the trough rearward of the walls 51 and 52, and this trough in combination with the angularity of the plate 43 will induce the elongated narrow silverware to seek a position in the trough in which lengthwise the silver alines with the pockets of the cleats 55 of the elevator and is thus induced to an attitude favorable to the movement of the silver articles into the successive pockets of the elevator cleats 55. The inclination of the wall 53 at the bottom of the trough will serve to cause sliding of the articles onto the cleats where the same will be retained in the pockets of the cleats owing to the formation thereof presented in the rising run of the elevator or conveyor.

The conveyor being in continuous operation at this time, the cleats will elevate the silver articles up in a substantially vertical path confronting the rinse unit 72 where fresh heated water will be sprayed upon the silver articles in the ascending pockets and remove all wash water therefrom and impose upon the silver articles a final cleansing step.

On ascending further in the conveyor the silver articles will be exposed to the sprays from the nozzles 76 of heated air or other gas which will thereupon dry the silver before the same is passed to the assorter.

As shown more particularly in FIGURE 3, the cleats in moving around the upper roller 79, will dump or unload the silver articles from the conveyor cleats onto the assorter chute 98 by which such articles are then delivered to the trough or bight of the assorter rolls 99, 100. As these articles move down the trough they are presented to the gap in the area of the roll section 103. As indicated in FIGURE 2, this gap is only sufficiently wide to permit of the dropping therethrough of such straight articles as knives, two of which are found to have been delivered to the bin at the left end of the assembly C. The forks and spoons having lateral offsets are required to move to the subsequent roll section 104 where the gap is stepped down to a wider degree which will permit, for instance, table forks to drop through to the second in line bin on the platform 136.

The next roll section 105 creates a larger gap suitable for the dropping therethrough of teaspoons, as shown in the third in line bin of FIGURE 2.

The roll section 106, in a four-unit assembly, will present a still larger gap passable by tablespoons, as shown in the bin to the right end of the assembly C in FIGURE 2.

The machine will continue its run until the timing relay times out, in which event the circuit will be open and the machine may then receive another charge of silver articles for a subsequent timed cycle of operations.

If, at any time, any bin becomes loaded, as indicated in FIGURE 18, the calculated weight of the silverware therein will have moved the tray 122 down to the position in which its mercury or other switch 138 has been brought under the influence of the descended magnet 144, which magnet will then attract and tilt the mercury switch 138 to move the liquid off the contact and thus disconnect the circuit, stopping the cycle until the filled bin may be removed and replaced by an empty bin.

If at any time, through the development of trouble or otherwise in any component, the entire system may be brought to a halt by depressing the stop on the control box 71.

Thus a fully automatic machine and process are provided in which a cycle of operations through a prescribed time period may be automatically carried out with stoppage only in the event of a full bin or by manual control.

While improvements exist in the cleansing unit, in the elevating unit and in the assorter unit, as well as in the bin complex, these various operations are linked together through the over-all control mechanism by which, due to the physical relative disposition of the various units, their functions are coordinated in an automatic timed operation contributing to a single result, namely, the final delivery of cleansed silver articles to the bin assembly from which such articles may from time to time be removed, delivered pursuant to service requirements.

At the end of a day's run or at the end of any other time period the machine may be cleaned by draining all the water through the bottom drain 37, removing the screens 49 and 50 for a cleansing operation, and subsequently introducing fresh wash water, manual access being had to the interior of the cleansing unit through the sliding or other door 32$^b$.

In case the machine is to be placed at an angle between walls, the assorter unit may be joined angularly to the cleansing and elevating unit.

While, for convenience in description, the objects treated have been identified as table silver, it will be understood that the machine may be applied to any other articles which require the cleansing and/or assorting operations of which the machine is capable.

In FIGURE 4 a solenoid valve 176 is shown as having an output 73 to the hot water stand pipe 72 and an inlet shown by the arrow as connecting with a source of heated water supply. This solenoid actuated valve is also shown as electrically connected with the control box 71.

A second solenoid valve 177 is connected by pipe 177$^a$ to the hot air spray unit 75 and through a pipe 177$^b$ to a source of heated air supply. At 177$^c$ the solenoid valve 177 is shown as electrically connected to the control box 71.

It will be apparent to those skilled in the art that the machine of this invention is adapted to replace all existing silver handling systems by automatically washing, rinsing, drying, sorting and storing in one continuous unattended operation.

The device in effect turns itself on (after initially pre-filling the wash reservoir) by the entry of silverware through the spring-loaded door 65 which actuates switch 69.

Switch actuation starts a timer which allows the machine to wash, rinse, dry and sort a full load of pieces and then to automatically shut off. At any time during the process, additional flatware may be introduced and will automatically re-program the machine to insure complete processing of all pieces.

Complete washing is accomplished by a total immersion of the flatware in filtered re-circulated detergent-laden water, the articles being thoroughly scrubbed by the action of a high velocity stream propelled by a self-contained pump which properly directs the flow of water through and around the silverware.

As the washing progresses, the pieces are removed from the bath by an endless conveyor which has cleats designed to permit the transport of only one piece at a time through a hot water rinse section (preferably at substantially 180° degrees F.) and thereupon through the drying area where the latent heat, absorbed in the rinse section accelerates natural air drying. Spot-free drying is accordingly secured.

The machine will assort any number of pieces, that is, a knife, fork, teaspoon, tablespoon, salad fork, shrimp fork, et al., of any pattern.

As the silver is sorted the machine delivers each different piece to a proper bin which will accept; as an example, up to 250 pieces of one type. When any one bin is full the machine is automatically shut off and cannot be re-started until that bin is replaced by an empty one.

The machine need not be hand-loaded but an initial conveyor may deliver articles to the initial chute 64 and a final conveyor may replace the bins and convey off the cleansed and sorted silver.

Although I have disclosed herein the best forms of the invention known to me at this time, I reserve the right to all such modifications and changes as may come within the scope of the following claims.

What is claimed is:

1. A control system for the operation of silver cleansing and assorting units comprising
   (a) an electric drive for activating the cleansing unit,
   (b) an electric drive for the assorting unit,
   (c) a conveyor between the units,
   (d) an electric drive for the conveyor,
   (e) normally open circuitry connecting the several drives, and
   (f) timing means in the circuitry for establishing when the circuitry is closed a timed cycle of operations including cleansing of a batch of silver, conveying the cleansed silver batch to the assorting unit, and sorting the silver.

2. A control system for the operation of silver cleansing and assorting units comprising
   (a) an electric drive for activating the cleansing unit,
   (b) an electric drive for the assorting unit,
   (c) a conveyor between the units,
   (d) an electric drive for the conveyor,
   (e) normally open circuitry connecting the several drives,
   (f) timing means in the circuitry for establishing when the circuitry is closed a timed cycle of operations including cleansing of a batch of silver, conveying the cleansed silver batch to the assorting unit, and sorting the silver, and
   (g) normally open switch means in the circuitry positioned to be closed by introduction of additional silver into the cleansing unit before the timing out of the timing cycle of any batch for reactivating the system to prolong the cycle into a second cycle fixed in time by the time of introduction of the additional silver to insure full cycle treatment for all silver introduced.

3. A control system for the operation of silver cleansing and assorting units comprising
   (a) an electric drive for activating the cleansing unit,
   (b) an electric drive for the assorting unit,
   (c) a conveyor between the units positioned relatively to the units to raise the silver when cleansed to an area above the cleansing unit,
   (d) an electric drive for the conveyor,
   (e) normally open circuitry connecting the several drives,
   (f) timing means in the circuitry for establishing when the circuitry is closed a timed cycle of operations including cleansing of a batch of silver, conveying the cleansed silver batch to the assorting unit, and sorting the silver,
   (g) rinse liquid discharge means in said area positioned to deliver rinse liquid on the silver as the conveyor moves through the area,
   (h) a valve in the discharge means, and
   (i) an electric actuator for the valve in the circuitry acting to open the valve on closing of the circuitry.

4. A control system for the operation of silver cleansing and assorting units comprising
   (a) an electric drive for activating the cleansing unit,
   (b) an electric drive for the assorting unit,
   (c) a conveyor between the units positioned relatively to the units to raise the silver when cleansed to an area above the cleansing unit,
   (d) an electric drive for the conveyor, (e) normally open circuitry connecting the several drives,
(f) timing means in the circuitry for establishing when the circuitry is closed a timed cycle of operations including cleansing of a batch of silver, conveying the cleansed silver batch to the assorting unit, and sorting the silver,
(g) drying gas discharging means in said area positioned to deliver drying gas to the silver as the conveyor moves through the area,
(h) valve means in the discharge means, and
(i) an electric actuator for the valve means in the circuitry acting to open the valve on closing of the circuitry.

5. A control system for the operation of silver cleansing and assorting units comprising
(a) an electric drive for activating the cleansing unit,
(b) an electric drive for the assorting unit,
(c) a conveyor between the units positioned relatively to the units to raise the silver when cleansed to an area above the cleansing unit,
(d) an electric drive for the conveyor,
(e) normally open circuitry connecting the several drives,
(f) timing means in the circuitry for establishing when the circuitry is closed a timed cycle of operations including cleansing of a batch of silver, conveying the cleansed silver batch to the assorting unit, and sorting the silver,
(g) rinse liquid discharge means in said area positioned to deliver rinse liquid on the silver as the conveyor moves through the area,
(h) drying gas discharge means in said area more remote from the cleansing unit than the rinse liquid discharge means positioned to deliver drying gas to to the silver as the conveyor moves through the area, and
(i) solenoid valves for both the liquid and gas discharge means normally closed included in the circuitry for opening incident to closing of the circuitry.

6. A control system for the operation of silver cleansing and assorting units comprising
(a) an electric drive for activating the cleansiing unit,
(b) an electric drive for the assorting unit,
(c) a conveyor between the units,
(d) an electric drive for the conveyor,
(e) normally open circuitry connecting the several drives,
(f) timing means in the circuitry for establishing when the circuitry is closed a timed cycle of operations including cleansing of a batch of silver, conveying the cleansed silver batch to the assorting unit, and sorting the silver,
(g) a bin platform adjacent the assorting unit,
(h) a set of normally closed switches in the circuitry installed in the platform,
(i) a set of normally open switches in the circuitry also installed in the platform,
(j) a set of bins removably mounted to the platform adapted when in place to close the set of normally open switches, and
(k) means movably carried by the bins biased to raised position and responsive to filling of the bins to move downwardly in position to open the normally closed switches to interrupt the circuitry and stop the cycle.

7. A control system as claimed in claim 6 in which said last-named means comprises
(1) trays movable up and down in the bins, and
(m) magnets carried by the trays.

8. A control system for the operation of silver cleansing and assorting units comprising
(a) an electric drive for activating the cleansing unit,
(b) an electric drive for the assorting unit,
(c) a conveyor between the units,
(d) an electric drive for the conveyor,
(e) normally open circuitry connecting the several drives,
(f) timing means in the circuitry for establishing when the circuitry is closed a timed cycle of operations including cleansing of a batch of silver, conveying the cleansed silver batch to the assorting unit, and sorting the silver,
(g) a bin platform adjacent the output of the assorting unit,
(h) a plurality of bins removably mounted on the platform in position to receive assorted silver from the assorting unit,
(i) silver receiving trays movable in the bins biased to an upper position adapted to receive silver and under load thereof descend to a final lowermost position,
(j) magnets depending from the trays,
(k) and normally closed switches in the circuitry tiltably installed in the platform in alignment with the trays and having armatures attracted by the tray magnets in the lower positions of the trays to open the circuitry.

9. A control system as claimed in claim 8 further comprising
(l) normally open switches in the circuitry installed in the platform, and
(m) means on the lower portions of the bins to close the normally open switches only when the bins are in position on the platform.

10. control system for combined cleansing and assorting units for table silver which comprises
(a) electrically actuated cleansing means for the silver,
(b) electrically actuated assorting means positioned to receive the cleansed silver from the cleansing means,
(c) timing means,
(d) normally open circuitry connecting said electrically actuated cleansing means, said electrically actuated assorting means and said timing means, and
(e) circuit closing means for closing said circuitry to energize the electrically actuated cleansing and assorting means through timed cycles as determined by the setting of said timer incident to the delivery of silver to the cleansing means.

11. For use with a cleansing unit in which silver articles are deposited in a cleansing chamber through which washing fluid is circulated by a motor-driven pump and in which the silverware is delivered by conveyor to a motor-driven assorter and later the articles delivered selectively to bins, a control system comprising
(a) electric motors for driving said pump, said conveyor and said assorter,
(b) circuitry connecting said various motors,
(c) a timer included in said circuitry for automatically timing out and opening the circuitry after preselected time delay, and
(d) means for automatically closing said circuitry on introduction of silver to the cleansing chamber.

12. A machine for cleansing and assorting table silver articles of various sizes comprising
(a) a cleansing unit including
(b) a cleansing chamber,
(c) an electric drive for activating the unit,
(d) a silver article assorting unit,
(e) an electric drive for the assorting unit,
(f) a conveyor between the units for removing the articles from the cleansing chamber,
(g) an electric drive for the conveyor,
(h) adjusting means positioned to receive the articles from the cleansing chamber and adjusting the articles to a common lengthwise orientation, said conveyor including
(i) an endless belt having
(j) silver article receiving pockets for receiving the articles so oriented, (k) normally open circuitry connecting the several drives, and (l) timing means in the circuitry for establishing when the circuitry is closed a timed cycle of operations including cleansing of a batch of silver, conveying the cleansed silver batch to the assorting unit, and sorting the silver.

13. A machine as claimed in claim 12 in which said conveyor is disposed in a substantially vertical position, said adjusting means comprises (m) a trough narrow with respect to the articles and defined by an upright wall in the cleansing chamber and the adjacent ascending leg of the conveyor.

14. A control system as claimed in claim 8 in which the means for biasing each tray to its upper position comprises (1) spring means of such a strength as to support the tray in its upper position until the tray is full of the assorted article and then permit the tray and its magnet to descend when the tray is full.

15. A control system for the operation of a silver cleansing unit comprising (a) an electric drive for activating the cleansing unit,
(b) normally open circuitry including the drive,
(c) timing means in the circuitry for establishing when the circuitry is closed a timed period of cleansing operation for the drive, and
(d) normally open switch means in the circuitry positioned to be closed by introduction of additional silver into the cleansing unit before the timing out of the timing cycle of any batch for reactivating the system to prolong the cycle into a second cycle fixed in time by the time of introduction of the additional silver to insure full cycle treatment for all silver introduced.

16. A control system for the operation of silver cleansing and assorting units comprising (a) An electric drive for activating the cleansing unit,
(b) an electric drive for the assorting unit,
(c) a conveyor between the units,
(d) an electric drive for the conveyor,
(e) normally open circuitry connecting the several drives,
(f) timing means in the circuitry for establishing when the circuitry is closed a timed cycle of operations including cleansing a batch of silver, conveying the cleansed silver batch to the assorting unit, and sorting the silver,
(g) a series of separate receptacles for the various items of silverware,
(h) trays movably mounted in the receptacles biased to a raised position but when loaded to a preselected weight of silverware adapted to descend by gravity in the receptacles, and
(i) normally closed switch means in the circuitry adapted to be opened on the descent of a tray to suspend the operation of the machine until the full tray is removed and a subsequent tray substituted.

17. A control system for the operation of silver cleansing and assorting units comprising (a) an electric drive for activating the cleansing unit,
(b) an electric drive for the assorting unit,
(c) normally open circuitry connecting the drives,
(d) a plurality of receptacles in the assorting unit for the various items of silverware,
(e) trays movably mounted in the receptacles biased to a raised position but when loaded to a preselected weight of silverware adapted to descend by gravity in the receptacles, and
(f) normally closed switch means in the circuitry positioned to be opened by the trays on descent to suspend the operation of the machine until the full tray is removed and a subsequent empty tray substituted.

References Cited by the Examiner

UNITED STATES PATENTS

| | | | |
|---|---|---|---|
| 498,549 | 5/1893 | Hodgdon | 134—74 |
| 904,010 | 11/1908 | Parry. | |
| 1,512,918 | 10/1924 | Forsgard | 134—48 X |
| 1,710,357 | 4/1929 | Grunwald | 134—67 X |
| 2,156,840 | 5/1939 | Davis | 134—63 |
| 2,180,947 | 11/1939 | Ball | 134—74 |
| 2,212,560 | 8/1940 | Foley | 134—58 X |
| 2,316,159 | 4/1943 | Evett | 134—63 |
| 2,633,437 | 3/1953 | Detjen | 134—25 |
| 2,989,179 | 6/1961 | Woods et al. | 209—72 |
| 3,009,466 | 11/1961 | Fox et al. | 134—58 |
| 3,028,957 | 4/1962 | Conway et al. | 209—106 |
| 3,051,309 | 8/1962 | Leathers | 209—72 |
| 3,076,730 | 2/1963 | Nolte | 134—25 |
| 3,115,144 | 12/1963 | Sadwith | 134—58 |
| 3,117,671 | 1/1964 | Pearce et al. | 209—106 |
| 3,162,259 | 12/1964 | Burroughs | 209—74 X |

FOREIGN PATENTS 250,402  6/1948  Switzerland.

CHARLES A. WILLMUTH, *Primary Examiner.*

ROBERT L. BLEUTGE, *Assistant Examiner.*